June 25, 1946.    T. HARADA    2,402,813
FASTENER DEVICE
Filed Nov. 22, 1943
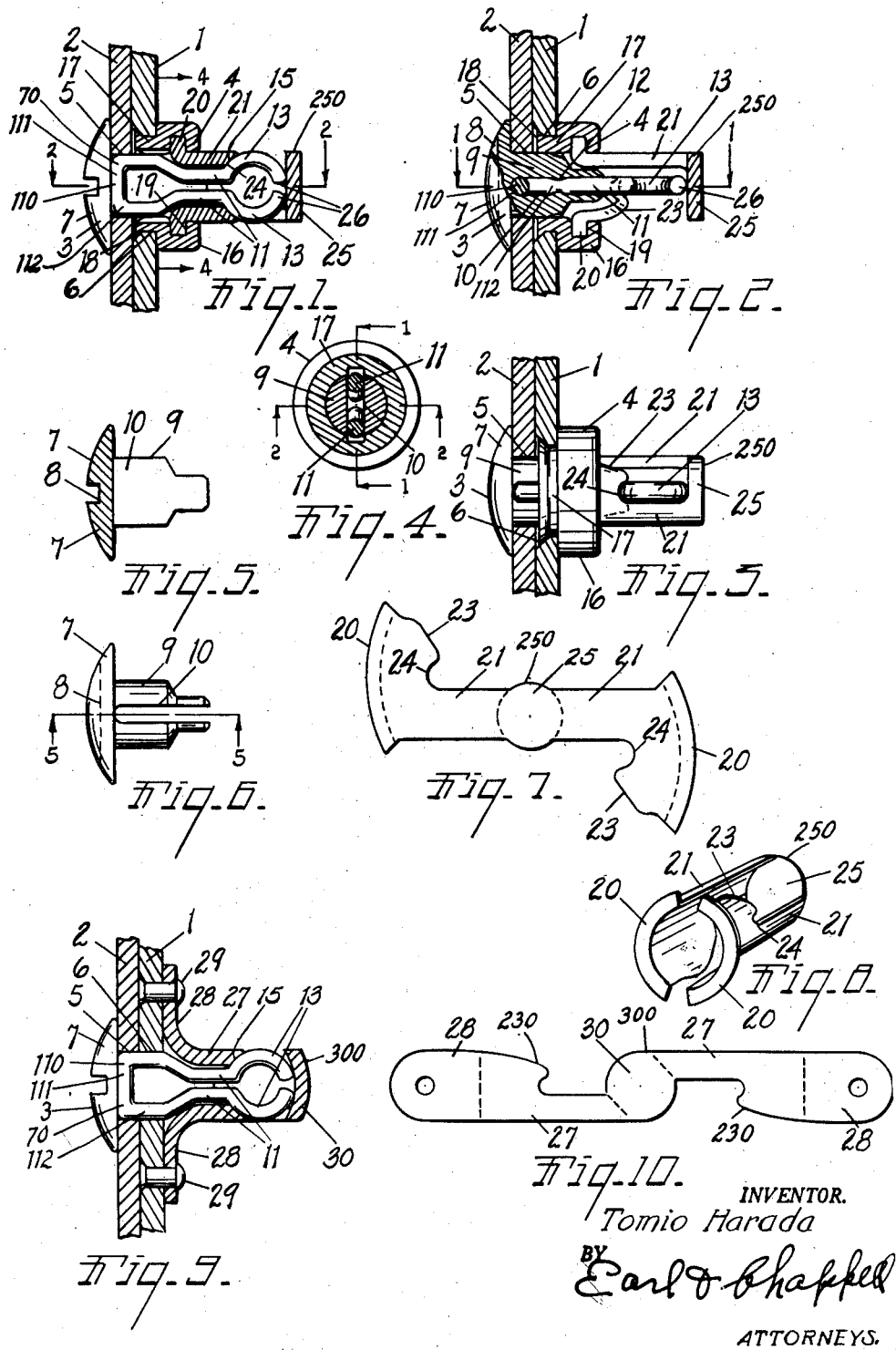
INVENTOR.
Tomio Harada
BY Earl T. Chappell
ATTORNEYS.

Patented June 25, 1946

2,402,813

UNITED STATES PATENT OFFICE 2,402,813

FASTENER DEVICE

Tomio Harada, Kalamazoo, Mich.

Application November 22, 1943, Serial No. 511,288

14 Claims. (Cl. 24—221)

1

This invention relates to improvements in fastener devices.

The main objects of this invention are:

First, to provide a fastener device in which the elements may be quickly and positively engaged by a quarter turn of the stud member relative to the socket member and at the same time one which requires relative rotative movement for disengagement.

Second, to provide a structure of this character which automatically adjusts itself to or accommodates substantial variation in the thickness of the work.

Third, to provide a fastener device having these advantages in which the parts are economical to produce and easily and quickly assembled.

Objects pertaining to details and economies of the invention will definitely appear from the description to follow; the invention is defined in the claims.

A structure which embodies the features of the invention is clearly illustrated in the accompanying drawing, in which:

Fig. 1 is a fragmentary sectional view of a fastener device embodying my invention applied to the work and partially in section on line 1—1 of Figs. 2 and 4.

Fig. 2 is a fragmentary view of the fastener shown in Fig. 1 on a section line corresponding to line 2—2 of Figs. 1 and 4.

Fig. 3 is a fragmentary view, the work being shown in section and the fastener in side elevation.

Fig. 4 is a transverse section on a line corresponding to line 4—4 of Fig. 1.

Fig. 5 is a sectional view of the head piece of the stud member on a line corresponding to line 5—5 of Fig. 6.

Fig. 6 is a side elevation of the head piece of the stud member.

Fig. 7 is a plan view of the blank of the keeper member of the socket.

Fig. 8 is a perspective view of the base of the socket keeper member.

Fig. 9 is a fragmentary sectional view of a modified form or embodiment of my invention, the modification being in the socket member.

Fig. 10 is a plan view of the blank from which the socket member of Fig. 9 is formed.

In the accompanying drawing 1 represents the frame or body portion of the work and 2 the part to be attached thereto. My fastener device comprises a stud member designated generally by the numeral 3 and a socket member designated generally by the numeral 4 adapted to rotatably

2 receive the stud member 3. The stud member 3 is inserted through a hole 5 in the work piece 2 and the socket member 4 is secured in a hole 6 in the work piece 1.

The stud member 3 is composed of two main parts, a head 7 and a stem 70. The head 7 has a kerf or slot 8 therein adapted to receive a tool such as a screwdriver. This head piece 7 also has an integral shank 9 provided with a longitudinal slot 10. The stem 70 comprises a wire loop 110 having spaced springable arms 11 and a connecting portion 111 intermediate said arms 11. The connecting portion 111 and inner portions 112 of the arms 11 adjacent said connecting portion 111 are disposed within the slot 10 of the shank 9 and secured therein by upsetting the shank 9 upon the portions 112 of arms 11 as indicated at 12, Fig. 2. The arms 11 are oppositely curved at 13 to provide shoulders 15 for engaging a keeper member hereinafter described.

The socket member 4 in the preferred embodiment illustrated in Figs. 1 to 8 inclusive comprises the work engaging base member 16 and the bifurcated keeper member 250. The work engaging base member 16 is tubular in shape and has a neck 17 inserted within the hole 6 in the work piece 1 and retained therein by riveting or upsetting at 18. This tubular base member 16 has an inwardly facing groove 19 which receives the flanges 20 on the inner ends of the arms 21 of the bifurcated keeper member 250. This keeper member 250 is formed as a sheet metal stamping, the blank being shown in Fig. 7. The arms thereof are bent into substantially parallel relation and conformed into a curved or segmental cross section as shown in Fig. 8, the flange 20 being turned outwardly to engage the groove 19. The arms 21 of the keeper member 250 are conformed to provide oppositely disposed cams 23 terminating in recesses 24. The ends of the arms 21 are connected by the cross piece 25 to form a closed end for the keeper member 250.

With the parts thus arranged the stud member 3 comprising the head 7 and stem 70 may be inserted through the hole 5 in the work piece 1 and given a quarter turn or rotation which causes its shoulders 15 to travel up the cams 23, gradually drawing the work together. At the end of this engaging movement the tips 26 of the springable arms 11 of the stem 70 are brought into springing or compressing engagement with the end 25 of the keeper member 250 of the socket member 4, springably but firmly holding the stud member 3 in engagement with the socket member 4. To disengage the parts it is necessary to not only spring the arms 11 toward each other, but to spring the tip portions longitudinally. The parts are thus very firmly held in engaged position, although they may be engaged with comparatively little effort and by a mere quarter turn or turn of 90 degrees of the stud member 3.

As stated, the fastener adjusts itself to substantial variation in the stock, that is, such variation as is permitted by the usual tolerances allowed in manufacture.

In the embodiment of the invention shown in Figs. 9 and 10 the fastening device comprises the stud member 3 and the socket member 27. The stud member 3 is the same in construction as the stud member 3 in the embodiment in Figs. 1 to 8 previously described, but the socket member 27 is somewhat modified from the socket member 4 previously described. The socket member 27 comprises a keeper member 300 of a single piece of metal as is shown in blank form in Fig. 10. This keeper member 300 is provided with cams 230 corresponding to the cams 23 of the embodiment previously described, and with flange-like extensions 28 secured to the work piece 1 by means of rivets 29. Each of these flange-like extensions 28 constitutes a work engaging base member to facilitate connection of the socket member to the work. This structure is somewhat more economical to produce than the preferred embodiment described. While it requires somewhat more stock for the keeper member 300 than for the keeper member 250 heretofore described, the tubular base member 16 is eliminated. In this embodiment the end 30 of the keeper member 300 is concave on the inner face thereof for engaging the free ends of the springable arms 11.

I have illustrated and described practical embodiments of my invention. I have not attempted to illustrate and describe certain modifications and adaptations which I contemplate as it is believed this disclosure will enable those skilled in the art to embody or adapt the invention as may be desired.

Having thus described my invention what I claim as new and desire to secure by Letters Patent is:

1. In a fastener, the combination of a stud member comprising a head having a longitudinally slotted shank and a stem comprising a wire loop having spaced springable arms having free ends, said arms adjacent the free ends thereof having oppositely curved shoulders, the free ends of the arms being normally spaced, the portion of the loop intermediate said arms being disposed in the slot of said shank and fixedly clamped therein, and a socket member for removably receiving said springable arms and comprising a tubular base member having a work engaging neck portion and an inwardly facing annular groove and a bifurcated keeper member having a closed end and spaced arms projecting therefrom, said arms having out-turned flanges retainingly engaged in said annular groove, the arms of said keeper member having opposed cams terminating in recesses with which the shoulders of the springable arms of said stem may be engaged by a quarter turn rotation of said stud member, the free ends of said stem arms being in yielding engagement with the closed end of said keeper member when the stud member is in fully engaged position within said socket member.

2. In a fastener, the combination of a stud member comprising a head having a longitudinally slotted shank and a stem comprising a wire loop having spaced springable arms, said arms terminating in oppositely curved shoulders, the portion of the loop intermediate said arms being disposed in the slot of said shank and fixedly clamped therein, and a socket member for removably receiving said springable arms and comprising a tubular base member having a work engaging neck portion and an inwardly facing annular groove and a bifurcated keeper member having a closed end and spaced arms projecting therefrom, said arms having out-turned flanges retainingly engaged in said annular groove, the arms of said keeper member having opposed cams terminating in recesses with which the shoulders of the springable arms of said stem may be engaged by a quarter turn rotation of said stud member.

3. In a fastener, the combination of a stud member comprising a work engaging head having a longitudinally slotted shank, spaced springable arms secured in said slot, said arms having free ends and oppositely curved shoulders, the free ends of the arms being normally spaced, a socket member for removably receiving said springable arms and comprising a work engaging tubular base member having an inwardly facing annular groove and a bifurcated keeper member having a closed end and spaced arms projecting therefrom, said arms having out-turned flanges retainingly engaged in said annular groove, the arms of said keeper member having opposed cams terminating in recesses with which the shoulders of the springable arms of said stud member may be engaged and disengaged by a rotative movement of said stud member, the free ends of said springable arms being in thrust engagement with the closed end of said keeper member when the stud member is in fully engaged position within said socket member.

4. In a fastener, the combination of a stud member comprising a work engaging head having a longitudinally slotted shank, spaced springable arms secured in said slot, said arms terminating in oppositely curved shoulders, a socket member for removably receiving said springable arms and comprising a work engaging tubular base member having an inwardly facing annular groove and a bifurcated keeper member having a closed end and spaced arms projecting therefrom, said arms having out-turned flanges retainingly engaged in said annular groove, the arms of said keeper member having opposed cams terminating in recesses with which the shoulders of the springable arms of said stud member may be engaged and disengaged by a rotative movement of said stud member.

5. In a fastener, the combination of a stud member comprising a work engaging head having a longitudinally slotted shank, spaced springable arms secured in said slot and conformed to provide shoulders, said arms having free ends, a socket member for removably receiving said springable arms and comprising a work engaging base member and a bifurcated keeper member carried thereby, said keeper member having a closed end and spaced arms projecting therefrom, the arms of said keeper member having opposed cams with which the shoulders of the springable arms of said stud member may be engaged by a rotative movement of said stud member, the free ends of said stud arms being in thrust engagement with the closed end of said keeper member when the stud member is in fully engaged position within said socket member.

6. In a fastener, the combination of a stud member comprising a work engaging head having a longitudinally slotted shank, spaced springable arms secured in said slot and conformed to provide shoulders, a socket member for removably receiving said springable arms and comprising a work engaging base member and a bifurcated keeper member carried thereby, said keeper member having a closed end and spaced arms projecting therefrom, the arms of said keeper member having opposed cams with which the shoulders of the springable arms of said stud member may be engaged by a rotative movement of said stud member.

7. In a fastener, the combination of a stud member comprising a work engaging head having a longitudinally slotted shank and a stem comprising a wire loop having spaced springable arms having free ends, said arms terminating in oppositely curved shoulders, the free ends of the arms being normally spaced, the portion of the loop intermediate said arms being disposed in the slot of said shank and fixedly clamped therein, and a socket member for removably receiving said springable arms and comprising a work engaging tubular base member and a bifurcated keeper member carried thereby, said keeper member having a closed end and spaced arms projecting therefrom, the arms of said keeper member having opposed cams terminating in recesses with which the shoulders of the springable arms of said stem may be engaged and disengaged by a rotative movement of said stud member, the free ends of said springable arms being in thrust engagement with the closed end of said keeper member when the stud member is in fully engaged position within said socket member.

8. In a fastener, the combination of a stud member comprising a work engaging head having a longitudinally slotted shank and a stem comprising a wire loop having spaced springable arms, said arms terminating in oppositely curved shoulders, the portion of the loop intermediate said arms being disposed in the slot of said shank and fixedly clamped therein, and a socket member for removably receiving said springable arms and comprising a work engaging tubular base member and a bifurcated keeper member carried thereby, said keeper member having a closed end and spaced arms projecting therefrom, the arms of said keeper member having opposed cams terminating in recesses with which the shoulders of the springable arms of said stem may be engaged and disengaged by a rotative movement of said stud member.

9. In a fastener, the combination of a stud member comprising a work engaging head having a longitudinally slotted shank and a stem comprising a wire loop having spaced springable arms, said arms terminating in oppositely curved shoulders, the portion of the loop intermediate said arms being disposed in the slot of said shank and fixedly clamped therein, and a socket member for removably receiving said springable arms and having opposed cams terminating in recesses with which the shoulders of the springable arms of said stem may be engaged and disengaged by a rotative movement of said stud member.

10. In a fastener, a stud member comprising a work engaging head having a longitudinally slotted shank and a stem comprising a wire loop having spaced springable arms, said arms terminating in oppositely curved shoulders, the portion of the loop intermediate said arms being disposed in the slot of said shank and fixedly clamped therein.

11. In a fastener, the combination of a stud member comprising a work engaging head and spaced springable arms fixedly secured thereto and conformed to provide oppositely disposed shoulders and a socket member for removably receiving said springable arms and comprising a work engaging base member and opposed cams with which said shoulders of said springable arms may be engaged by a rotative movement of said stud member, said socket member being provided with an end portion with which the ends of said arms springably engage when the spring arms are fully seated in said socket member.

12. In a fastener, the combination of a stud member comprising a work engaging head and spaced springable arms fixedly secured thereto and conformed to provide oppositely disposed shoulders and a socket member for removably receiving said springable arms and comprising a work engaging base member and opposed cams with which said shoulders of said springable arms may be engaged by a rotative movement of said stud member.

13. A fastener socket member comprising a work engaging tubular base member having an inwardly facing annular groove and a bifurcated keeper member having spaced arms, said arms having out-turned flanges retainingly engaged in said annular groove, the arms of said keeper member having opposed cams terminating in recesses with which the shoulders of a stud member may be engaged and disengaged by a rotative movement of said stud member.

14. A fastener socket member comprising a work engaging base and a bifurcated keeper member carried thereby, said keeper member having spaced arms, said arms having opposed cams with which the shoulder of a springable stud member may be engaged by a rotative movement of said stud member.

TOMIO HARADA.